(12) United States Patent
Schmalzl

(10) Patent No.: US 8,499,747 B2
(45) Date of Patent: Aug. 6, 2013

(54) METHOD AND DEVICE FOR OPERATING AN INTERNAL COMBUSTION ENGINE

(75) Inventor: Hans-Peter Schmalzl, Reichelsheim (DE)

(73) Assignee: BorgWarner Inc., Auburn Hills, MI (US)

( * ) Notice: Subject to any disclaimer, the term of this patent is extended or adjusted under 35 U.S.C. 154(b) by 406 days.

(21) Appl. No.: 12/439,857

(22) PCT Filed: Sep. 6, 2007

(86) PCT No.: PCT/EP2007/007793
§ 371 (c)(1),
(2), (4) Date: Mar. 4, 2009

(87) PCT Pub. No.: WO2008/028666
PCT Pub. Date: Mar. 13, 2008

(65) Prior Publication Data
US 2010/0059026 A1   Mar. 11, 2010

(30) Foreign Application Priority Data
Sep. 8, 2006   (DE) .......................... 10 2006 042 839

(51) Int. Cl.
*F02B 33/00* (2006.01)
*F02B 33/40* (2006.01)
*F02B 33/38* (2006.01)
*F02B 39/04* (2006.01)

(52) U.S. Cl.
CPC ..................................... *F02B 39/04* (2013.01)
USPC .......... 123/559.1; 60/598; 60/602; 123/90.15

(58) Field of Classification Search
CPC ............. F02B 39/04; F02B 33/40; F02B 33/38
USPC ...................... 60/598, 602; 123/90.15, 559.1
IPC ....................................................... F02B 33/00
See application file for complete search history.

(56) References Cited

U.S. PATENT DOCUMENTS 4,530,640 A * 7/1985 MacInnes ..................... 415/144
5,943,864 A * 8/1999 Sumser et al. .................. 60/602
(Continued)

FOREIGN PATENT DOCUMENTS
AU   1630383 A   1/1984
DE   4242494 C1   9/1993
(Continued)

OTHER PUBLICATIONS

"Advanced Technologies: Air Induction" Dieselnet Technology Guide, XX, XX, Jul. 2002, pp. 1-12.

*Primary Examiner* — John K Kim
(74) *Attorney, Agent, or Firm* — William G. Anderson; Stephan A. Pendorf; Patent Central LLC (57) ABSTRACT

The invention relates to a method for operating an internal combustion engine in the form of a spark-ignition engine (2) having the following method steps: pre-compressing the air supplied to the combustion chambers (15A-15D) of the internal combustion engine (2), directly injecting fuel into the combustion chambers (15A-15D) of the internal combustion engine (2), and adjusting the valve overlap of the gas exchange valves corresponding to the load range in which the internal combustion engine (2) is operated, characterized by the following method step: carrying out the pre-compression in a charging device in the form of an exhaust-gas turbocharger having a turbine (5) with variable turbine geometry (VTG), wherein the engine exhaust gas is supplied to the turbine (5) via separate spiral ducts (17A, 18A; 17B, 18B) of a multi-flow turbine housing (16A; 16B).

11 Claims, 10 Drawing Sheets

U.S. PATENT DOCUMENTS

| Patent No. | Date | Inventor | Class |
|---|---|---|---|
| 6,269,643 B1 * | 8/2001 | Schmidt et al. | 60/602 |
| 6,324,847 B1 * | 12/2001 | Pierpont | 60/605.2 |
| 6,672,060 B1 * | 1/2004 | Buckland et al. | 60/602 |
| 7,010,918 B2 * | 3/2006 | Ruess | 60/624 |
| 2002/0059914 A1 * | 5/2002 | Yamaguchi et al. | 123/299 |
| 2003/0000211 A1 * | 1/2003 | Drangel et al. | 60/602 |
| 2003/0230085 A1 * | 12/2003 | Sumser et al. | 60/602 |
| 2005/0126169 A1 * | 6/2005 | Ruess | 60/612 |
| 2006/0065257 A1 * | 3/2006 | Katoh | 123/688 |
| 2010/0059026 A1 * | 3/2010 | Schmalzl | 123/559.1 |

FOREIGN PATENT DOCUMENTS

| Country | Number | Date |
|---|---|---|
| DE | 19924228 A1 | 12/2000 |
| DE | 10041806 A1 | 3/2001 |
| DE | 102005002246 A1 | 7/2006 |
| EP | 1650421 A1 | 4/2006 |
| GB | 987582 A | 3/1965 |
| WO | 0073630 A1 | 12/2000 |
| WO | 2006076954 A1 | 7/2006 |

* cited by examiner

METHOD AND DEVICE FOR OPERATING AN INTERNAL COMBUSTION ENGINE

The invention relates to a method and to a device for operating an internal combustion engine, as per the preamble of claim 1 and of claim 4.

A generic method and a generic device are known from DE 103 03 705 B4.

In the known method and the known device, use is made of a supercharging device which is provided with a so-called wastegate, in order to be able to control the power of said supercharging device.

In particular if the internal combustion engine is a spark-ignition engine, use is made of supercharging devices or exhaust-gas turbochargers with single-flow turbines and wastegate valves since these have previously appeared to be most suitable with regard to the higher exhaust-gas temperatures of spark-ignition engines and the greater air throughput range.

However, spark-ignition engines having a wastegate turbocharger still have a considerable amount of room for improvement with regard to fuel consumption and driving dynamics.

It is therefore an object of the present invention to create a method and a device for operating an internal combustion engine of the generic type corresponding to the preamble of claim 1 and of claim 4 respectively which permit an improvement in efficiency in particular with regard to the torque generation and fuel consumption.

Said object is achieved by means of the features of claim 1 and of claim 4.

According to the invention, in the method according to claim 1 and the device according to claim 4, use is made of an exhaust-gas turbocharger having an adjustable turbine geometry and having a multi-flow turbine housing, which leads to a considerably improved pulse utilization of the exhaust-gas energy and therefore to an increase in charge pressure in the lower engine load and speed range. Consideration is given here in particular to twin-flow and double-flow turbine housings.

In the case of a twin-flow housing, the two spiral ducts are situated axially adjacent to one another and are separated from one another by a partition. On account of the design, the overflow cross sections cannot be designed to be as small as desired, such that a mixture of the two flows can take place to a certain extent. This has a positive effect in the medium and high rotational speed range, since the pulse effect is no longer desirable there since there is sufficient charge pressure available.

The double-flow turbine housing is characterized by two turbine strands in the form of spiral ducts which are guided radially separately about the turbine periphery, with it being possible for the overflow cross sections to be designed to be as small as possible, and with the mutual influencing of the exhaust-gas flows thereby being minimized. This has the result that, in the medium and upper engine speed and load range, additional measures are advantageous in order to reduce the exhaust-gas pressure level and charge pressure level.

To compensate a reduced maximum throughput through the turbine with the double-flow arrangement on account of the limited supply flow cross section over the periphery of the turbine (180° per turbine strand), it is advantageous to provide the double-flow turbine with a pulse/ram switching arrangement. With said switching arrangement, it is possible for the two turbine strands to be connected at medium and high engine speeds (for example above 3000 rpm). If the switching valve which is provided for this purpose is opened, the exhaust gas can be distributed to both turbine strands and the pulsation is additionally reduced. Both effects cause the turbine load to be lowered, and therefore the desired limitation of the charge pressure.

It is simultaneously possible for the pulse/ram switching valve to be operated as an additional wastegate, which provides the advantage that the throughput range of the turbine can be increased yet further.

According to the invention, it is therefore possible in connection with an adjustment of the valve overlap of the gas-exchange valves to utilize the full potential of the optimized flow separation of a turbocharger with a multi-flow turbine housing. This is because it is possible according to the invention to realize longer valve overlaps in the lower engine speed range, and to therefore significantly increase the scavenging air proportion in said characteristic map range.

Said measure has a very positive influence on the engine performance data for the following reasons:
- reduced knock sensitivity as a result of a reduction of the residual gas proportion;
- a reduction of the mean exhaust-gas temperature upstream of the turbine of the exhaust-gas turbocharger, and therefore the possibility of increasing the combustion air ratio; and
- a reduction of the required throughput range for the compressor and the turbine of the exhaust-gas turbocharger, and therefore the possibility of operating the exhaust-gas turbocharger with improved levels of efficiency.

The subclaims contain advantageous refinements of the method according to the invention and of the device according to the invention.

Tests carried out within the context of the invention have shown that the measures according to the invention, of providing an exhaust-gas turbocharger with variable turbine geometry and a double-flow turbine and the preferably provided pulse/ram switching arrangement and the provision of an increased valve overlap, can lead to an increase in the steady-state full load torque of 40% at rotational speeds of $n_M$ of 1500 rpm. At the same time, the scavenging pressure gradient can be improved by approximately 400 mbar at the nominal horsepower point in relation to a single-flow wastegate-based charger.

Further tests carried out within the context of the invention have shown that, in dynamic operation, with the example of a load step at $n_M$ of 1800 rpm, it is possible for the time taken to reach 90% of the nominal torque to be shortened by approximately 50%.

Further details, advantages and features of the present invention can be gathered from the following description of exemplary embodiments on the basis of the appended drawing, in which.

Figure 1:
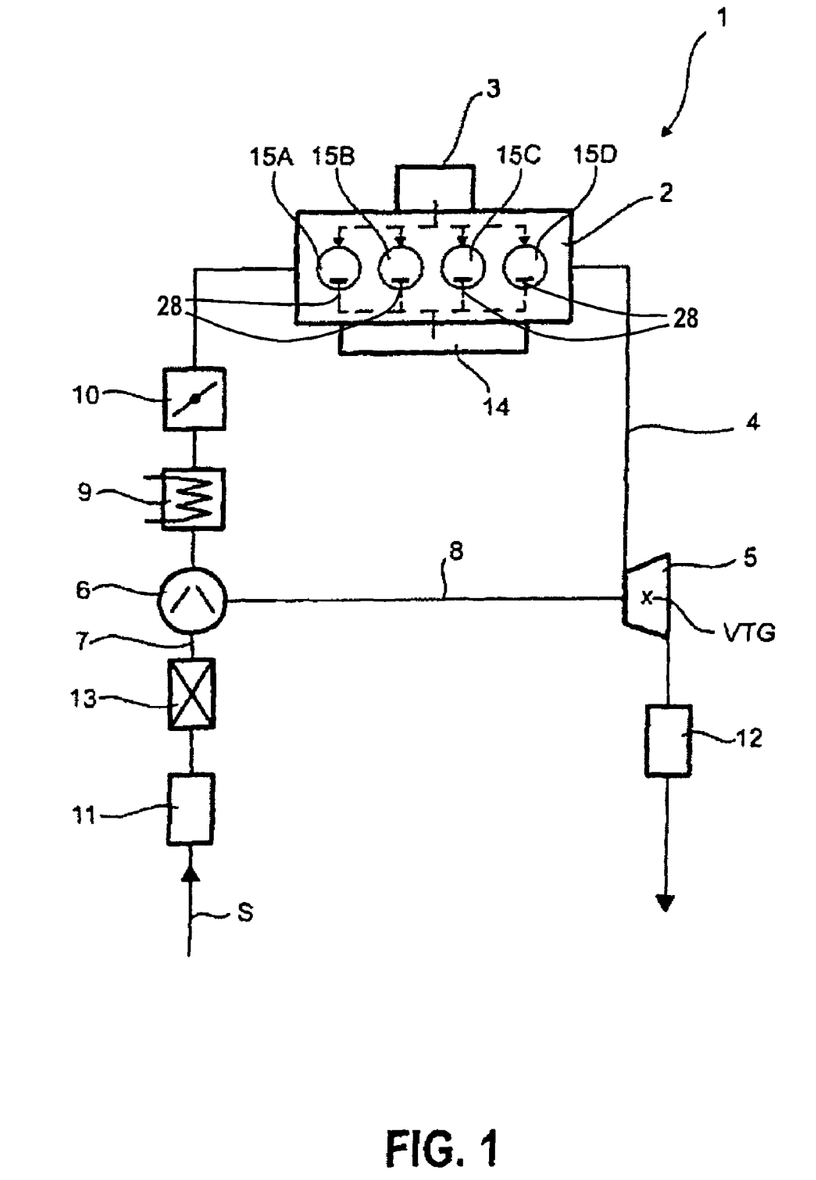
FIG. 1 shows a schematically highly simplified block circuit diagram of a device according to the invention for operating an internal combustion engine in the form of a spark-ignition engine with direct injection.

FIG. 1 illustrates, in simplified form as a block circuit diagram, a device 1 for operating an internal combustion engine 2 which is designed as a spark-ignition engine with direct injection. Internal combustion engines, in particular spark-ignition engines with direct injections, are to be understood to mean internal combustion engine in which, in contrast to intake pipe injection, fuel is injected at high pressure directly into the combustion chambers of the internal combustion engine. For this purpose, it is possible to use injection devices with a central pressure accumulator (common rail) in which a fuel pressure, which is regulated by an electronic control unit of the internal combustion engine via a pressure sensor and a pressure regulating arrangement, is built up in the distributor strip (common rail) by means of a high-pressure pump, with said pressure being at least substantially independent of the rotational speed and the injection quantity. An injection system of said type is illustrated symbolically in FIG. 1 by the block 3 on the spark-ignition engine 2.

In detail, the device 1 has a supercharging device in the form of an exhaust-gas turbocharger which, as is conventional, has a turbine 5 which is arranged downstream of the internal combustion engine 2 in an exhaust duct 4 and which interacts with a compressor 6 which is arranged in an intake duct 7. The turbine 5, which is driven by the exhaust gas, drives the compressor 6, as is depicted by the connecting line 8. According to the invention, the turbine 5 of the exhaust-gas turbocharger is provided with a variable turbine geometry (not illustrated in any more detail), which is depicted in FIG. 1 by the conventional abbreviation VTG. The exhaust-gas turbocharger according to the present invention may otherwise be designed as a conventional exhaust-gas turbocharger with VTG, as is illustrated for example in EP 1 398 463 B1, wherein corresponding adaptations are self-evidently made, with regard to the materials used, to the temperature level of a spark-ignition engine, since the exhaust-gas temperature level is higher than that of diesel engines, in which turbochargers with variable turbine geometries have already been used for a long time. The content of disclosure of EP 1 398 463 B1 is hereby incorporated into the content of disclosure of the present application by reference.

In the particularly preferred embodiment illustrated in FIG. 1, a charge-air cooler 9 is provided downstream of the compressor 6, from which charge-air cooler 9 the compressed and cooled intake air is conducted via a throttle flap block 10 to the combustion chambers 15A-15D of the spark-ignition engine 2. An air filter 11 and an air mass sensor 13 are arranged, in the conventional way, upstream of the compressor 6 (as viewed in the flow direction S), which air filter 11 and air mass sensor 13 however do not play any special role in the present invention, but have been described for completeness.

All the other usual assemblies are of course also provided, which assemblies are however not described in any more detail below since they are not required for explaining the principles of the present invention.

The device 1 however also has a device 14 for adjusting the valve overlap of the gas-exchange valves 28 of the internal combustion engine or spark-ignition engine 2, which device is depicted in FIG. 1 by the block 14. It is possible by means of said device 14 to vary the valve overlap in order, as explained in the introduction, to make it possible to targetedly set different overlaps of the degree of opening of the inlet-side and outlet-side gas-exchange valves 28, with greater overlaps permitting an improvement of the scavenging of residual gas by means of greater fresh air quantities, which is possible in spark-ignition engines with direct injection since, as explained above, the direct injection injects the fuel directly into the combustion chambers and not into the intake air flowing through the intake pipe.

For completeness, it is pointed out that it is of course also possible to provide the device 1 illustrated in FIG. 1 with an exhaust-gas catalytic converter 12 which may be arranged downstream of the turbine 5 in the exhaust tract of the internal combustion engine 2.

Figure 2A:
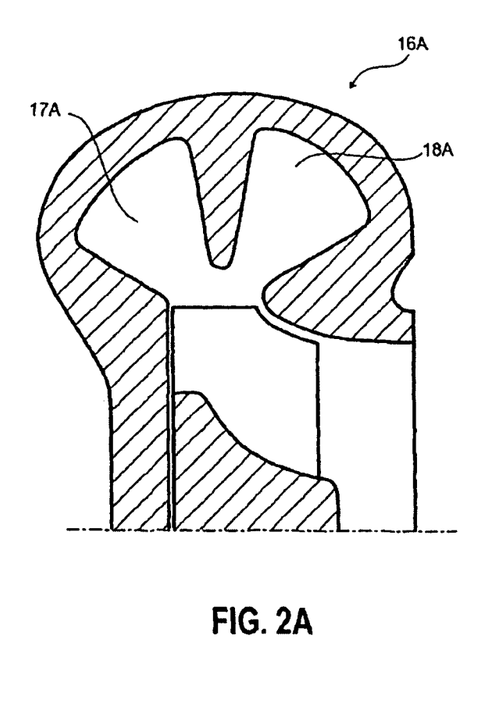
FIGS. 2A, 2B show a schematically simplified illustration of a twin-flow or double-flow turbine housing of a turbocharger which is part of the device according to FIG. 1.
Figure 2B:
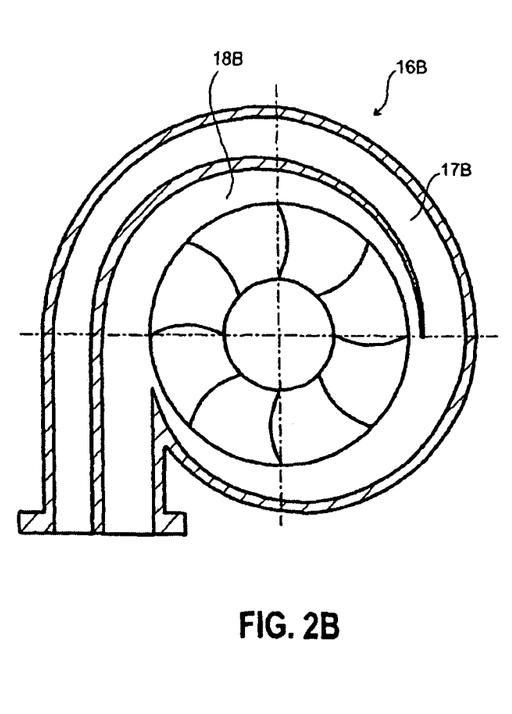

As has likewise already been explained in the introduction, the turbine 5 of the exhaust-gas turbocharger 5 of the device 1 according to the invention is also provided with a multi-flow turbine housing, which is illustrated in more detail in FIGS. 2A, 2B, in addition to a variable turbine geometry VTG.

FIG. 2A illustrates a twin-flow turbine housing 16A which has spiral flows 17A and 18A.

FIG. 2B illustrates a double-flow turbine housing 16B with two spiral ducts 17B and 18B which are guided separately about the turbine periphery, and which make it possible for the overflow cross sections to be reduced extremely in size and therefore to minimize the mutual influencing of the exhaust-gas flows. With a turbine housing 16 of said type, it is possible to utilize the full potential of the flow separation, which results from the separate guidance of the spiral ducts 17 and 18, in connection with the adjusting device 14 for camshaft adjustment in the engine characteristic map and therefore for varying the overlap of the gas-exchange valves 28. It is possible in particular to realize the above-explained relatively long valve overlaps in the lower engine speed range, and therefore to significantly increase the scavenging air proportion in said characteristic map range.

Figure 3:
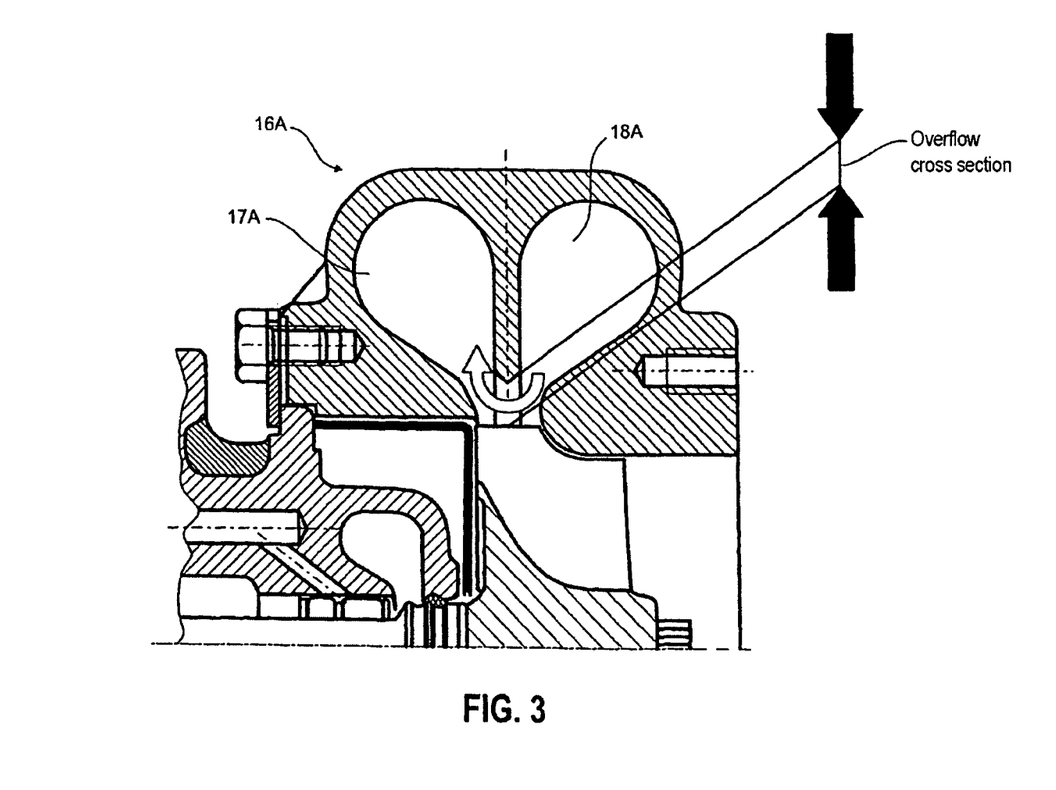
FIG. 3 shows an illustration of the overflow cross section of the twin-flow housing.

FIG. 3 shows the mutual influencing of the two spiral flows 17A, 18A of the twin-flow turbine housing 16A on the basis of the overflow cross section.

Figure 4A:
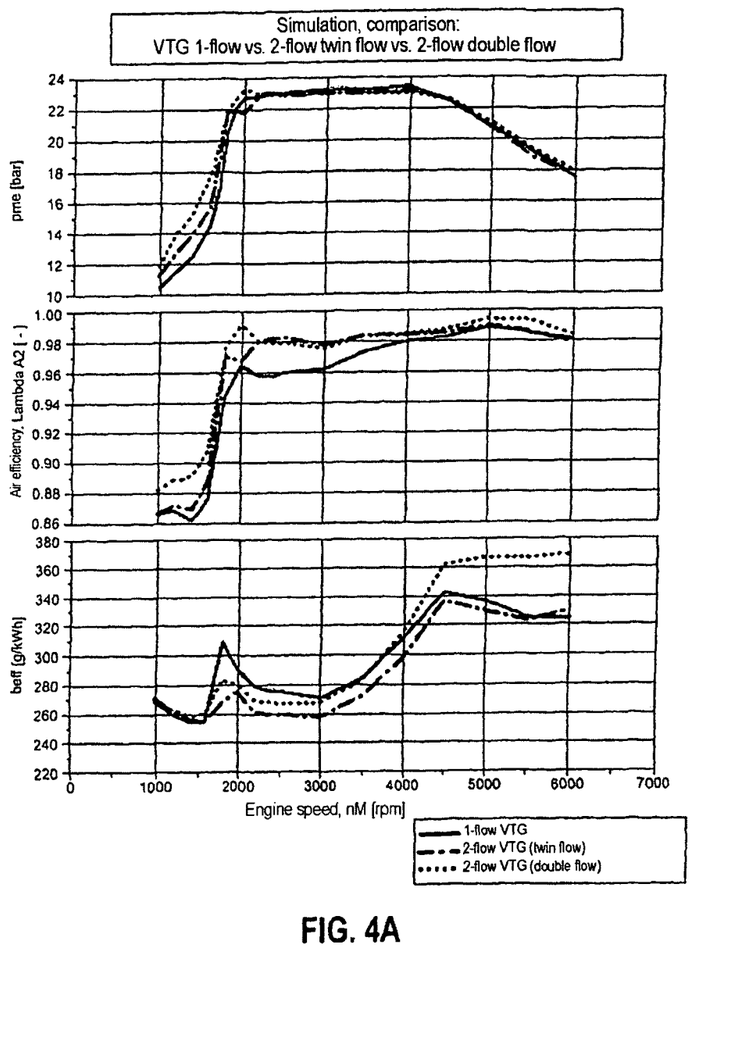
FIGS. 4A, 4B show comparative engine values for a single-flow, twin-flow and double-flow turbine housing.
Figure 4B:
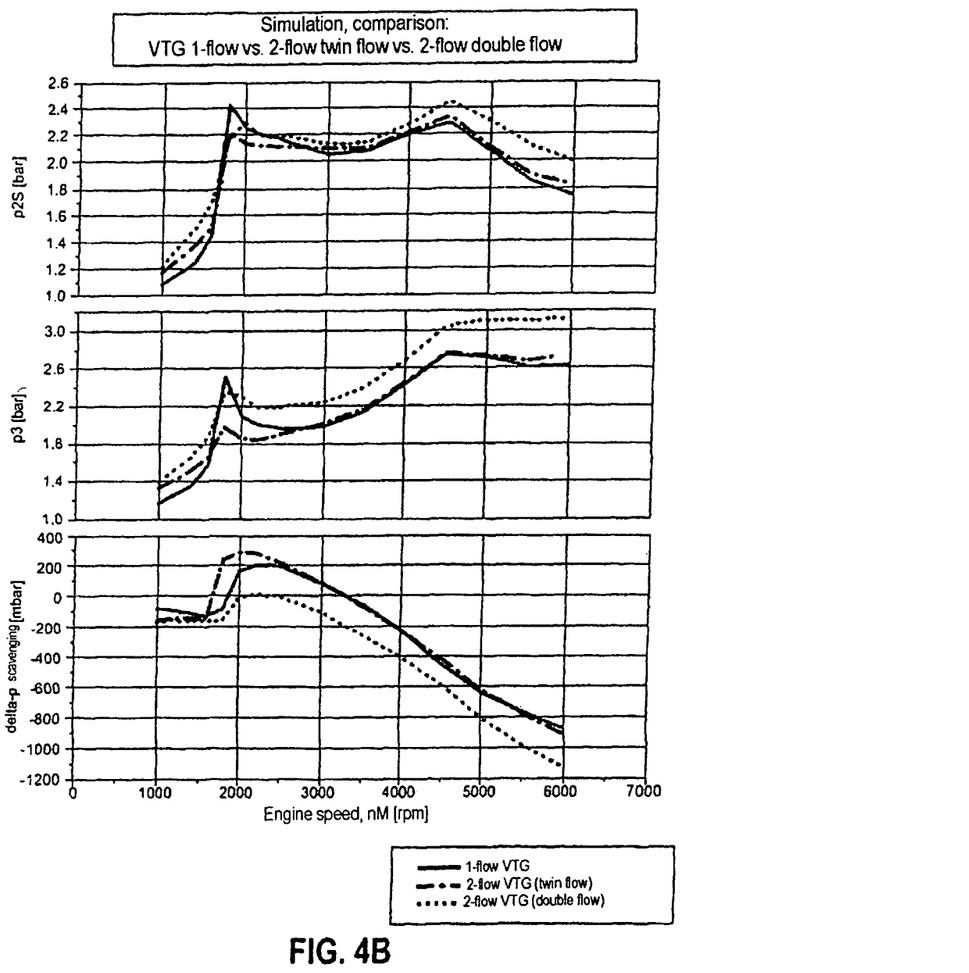

FIGS. 4A, 4B show comparative full-load engine values with the supercharger variants "1-flow with VTG" as a basis and with "2-flow twin flow with VTG" and "2-flow double flow with VTG". It can be seen that, in the rotational speed range 1000-2000 rpm, the 2-flow variants have advantages in terms of the torque build-up and the double-flow housing (without pulse/ram switching) results in disadvantages in terms of the pressure level and fuel consumption above 4000 rpm.

Figure 5A:
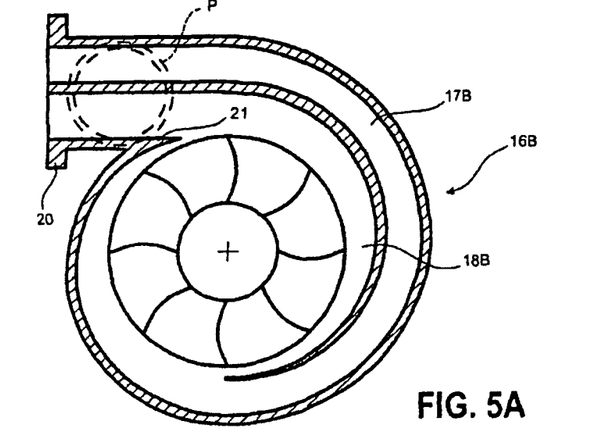
FIGS. 5A, 5B show a schematically simplified illustration of a double-flow turbine housing with a pulse/ram switching valve.
Figure 5B:
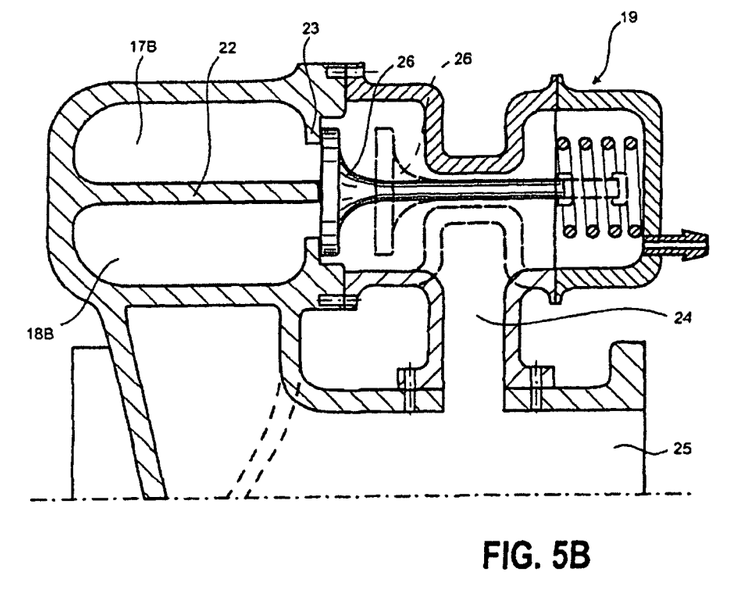

FIGS. 5A, 5B show an exemplary arrangement of a pulse/ram switching valve 19 in connection with the double-flow turbine housing 16B. The pulse/ram switching valve 19 may either be arranged as a separate unit upstream of the turbine housing inlet flange 20 or be integrated on the side of the turbine housing inlet duct. Here, it should be ensured that the valve 19 is positioned P upstream of the turbine housing tongue 21 in order to ensure that no mass outflow of exhaust gas into the turbine wheel can take place upstream of said valve 19.

The valve 19 is characterized in that, during small lifts, said valve 19 rises up from the partition 22 of the two turbine housing strands 17B, 18B and a mixture and therefore a pressure equalization between the strands is permitted. The valve seat 23 may be designed in such a way that, in the event of relatively large lifts of the closing part 26, a bypass quantity may additionally flow through a bypass 24 in the direction of the turbine housing outlet 25. The activation of the valve 19 may take place pneumatically, electrically or electromagnetically in the conventional manner.

The arrangement of a pulse/ram switching valve 19 in a twin-flow housing takes place radially at the outer periphery of the housing, upstream of the housing tongue, but is not illustrated in any more detail.

Figure 6A:
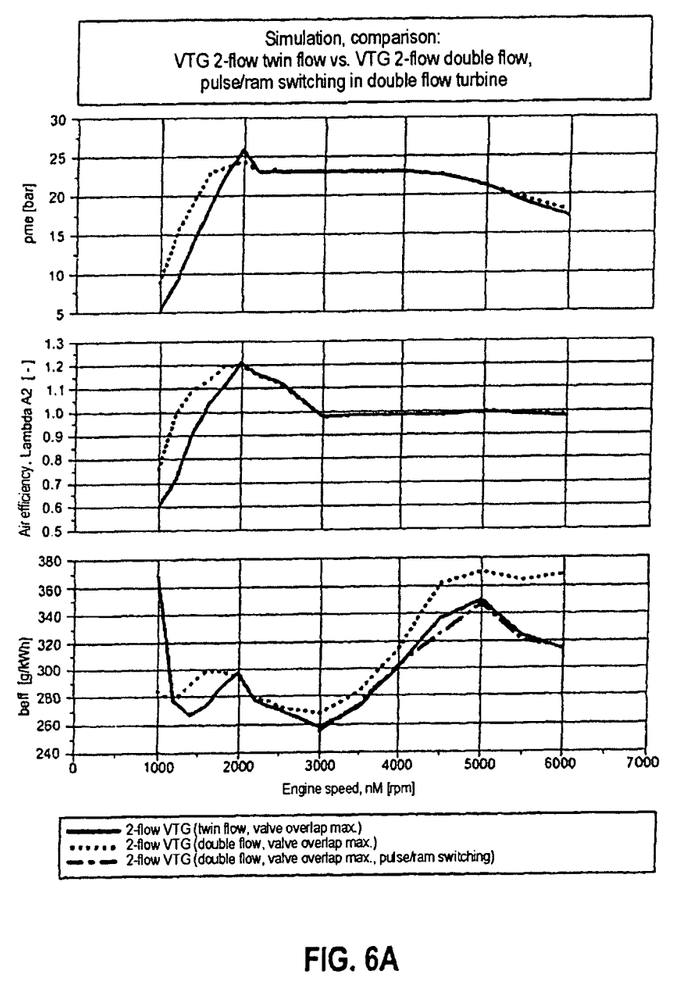
FIGS. 6A, 6B show comparative engine values with and without pulse/ram switching.
Figure 6B:
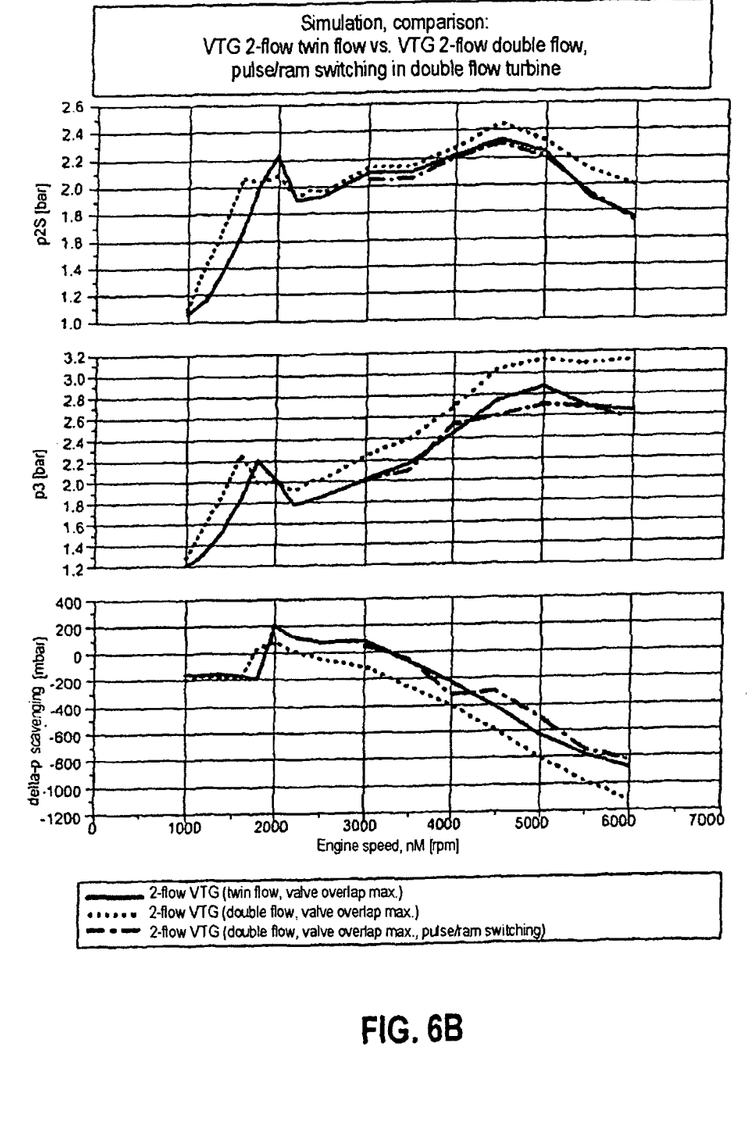

FIGS. 6A, 6B illustrate the influence of the increased valve overlap and of the pulse/ram switching on the engine performance values. It can be seen that a considerable increase in torque can be obtained in the lower engine speed range between 1000 and 2000 rpm. At rotational speeds above 3000 rpm, it is possible by opening the pulse/ram valve to prevent a rise in the exhaust-gas pressure level and the resulting higher fuel consumption.

Figure 7:
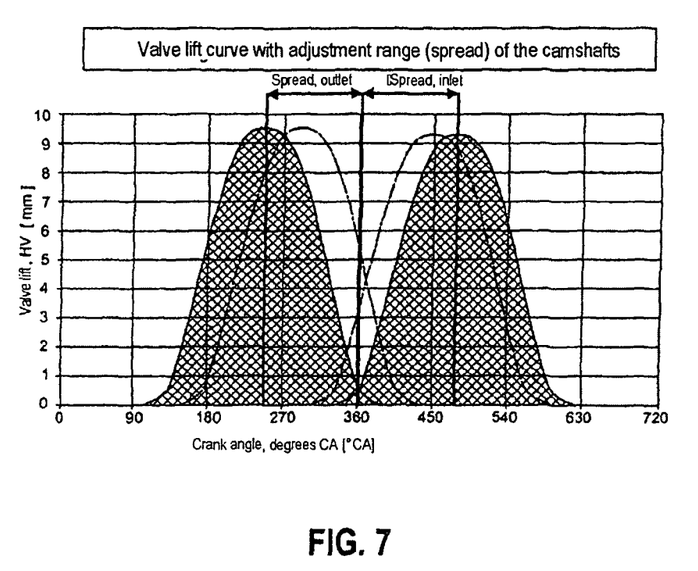
FIG. 7 shows the displacement of the valve lift curves.

FIG. 7 shows, by way of example, the possible displacement of the valve lift curves on account of a camshaft adjustment. Here, the spread describes the time interval between the respective curve maximum and top dead center in degrees crank angle. Small spread values therefore lead to a large valve overlap.

Figure 8:
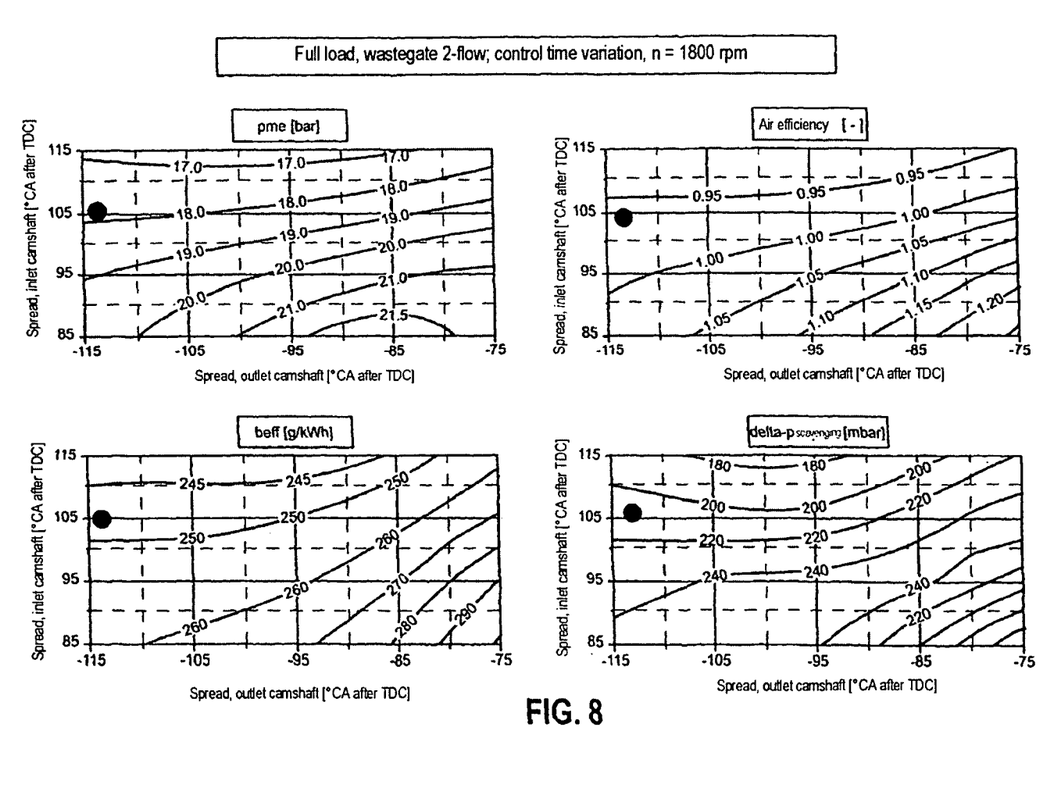
FIG. 8 shows the influence of the valve overlap on the engine values.

In FIG. 8, it can be seen that, proceeding from the basic version (in each large dot at the top left of the diagrams), it is possible with increasing valve overlap for the engine mean effective pressure and the air efficiency to be considerably increased for an unchanged scavenging pressure gradient. However, said torque increase is likewise associated with an increase in fuel consumption.

To complement the disclosure, reference is hereby explicitly made to the diagrammatic illustration of the invention in the appended figures.

LIST OF REFERENCE SYMBOLS

1 Device for operating an internal combustion engine
2 Internal combustion engine, or spark-ignition engine
3 Direct-injection system
4 Exhaust duct
5 Turbine
6 Compressor
7 Intake duct
8 Connecting line
9 Charge-air cooler
10 Throttle flap block
11 Air filter
12 Exhaust-gas catalytic converter
13 Air mass sensor
14 Device for adjusting the valve overlap
15A-15D Combustion chambers of the spark-ignition engine 2
16A Twin-flow turbine housing
16B Double-flow turbine housing
17A, 18A Spiral flows
18A, 18B Spiral ducts
19 Pulse/ram switching valve
20 Turbine housing inlet flange
21 Turbine housing tongue
22 Partition
23 Valve seat
24 Bypass
25 Turbine housing outlet
26 Closing part or valve plunger
28 Gas exchange valves
P Position of the pulse/ram switching valve 19 between the turbine housing inlet flange 20 and the turbine housing tongue 21

The invention claimed is:

1. A method for operating an internal combustion engine in the form of a spark-ignition engine (2), the internal combustion engine (2) having gas exchange valves (28), the method comprising:
pre-compressing the air which is supplied to the combustion chambers (15A-15D) of the internal combustion engine (2),
direct injection of fuel into the combustion chambers (15A-15D) of the internal combustion engine (2),
adjusting valve overlap of the gas-exchange valves (28) corresponding to the load range in which the internal combustion engine (2) is operated,
carrying out the pre-compression in a supercharging device in the form of an exhaust-gas turbocharger having a turbine (5) with variable turbine geometry (VTG), with the engine exhaust gas being supplied to the turbine (5) via separate spiral ducts (17A, 18A; 17B, 18B) of a multi-flow turbine housing (16A; 16B), and
joining the separate turbine streams, which are formed by the separate spiral ducts (17A, 18A; 17B, 18B), at medium and/or high engine rotational speeds by opening a switching valve (19), whereby at least a portion of the joined turbine streams are supplied to the turbine (5).

2. The method as claimed in claim 1, wherein a double-flow turbine housing (16B) is used as a multi-flow turbine housing.

3. The method as claimed in claim 1, wherein a twin-flow turbine housing (16A) is used as a multi-flow turbine housing.

4. The method as claimed in claim 1, further comprising the method step of operating the switching valve (19) as a wastegate.

5. A device for operating an internal combustion engine in the form of a spark-ignition engine (2), the internal combustion engine (2) having gas exchange valves (28), comprising:
a supercharging device in the form of an exhaust-gas turbocharger (5, 6),
a fuel direct injection device (3),
a device (14) for adjusting valve overlap of the gas-exchange valves (28) of the internal combustion engine (2), the device (14) being configured to adjust the valve overlap of the gas-exchange valves (28) corresponding to the load range in which the internal combustion engine (2) is operated,
the exhaust-gas turbocharger (5, 6) being provided with a variable turbine geometry (VTG) and a turbine (5), the turbine (5) being provided with a multi-flow turbine housing (16A; 16B) which has two separately-guided spiral ducts (17A, 18A; 17B, 18B), and
a switching valve (19) for connecting the spiral ducts (17A, 18A; 17B, 18B) of the multi-flow turbine housing (16A; 16B), the switching valve (19) being configured to open at medium and/or high engine rotational speeds, whereby exhaust gases in the two separately-guided spiral ducts (17A, 18A; 17B, 18B) mix and pressure equalization between the two ducts (17A, 18A; 17B, 18B) is permitted.

6. The device as claimed in claim 5, wherein the turbine housing is designed as a twin-flow turbine housing (16A).

7. The device as claimed in claim 5, wherein the turbine housing is designed as a double-flow turbine housing (16B).

8. The device as claimed in claim 5, wherein the turbine housing (16A; 16B) has a bypass duct (24) which can be opened and closed by means of the switching valve (19).

9. The device as claimed in claim 5, further comprising an exhaust-gas catalytic converter (12) which is arranged downstream of the turbine (5) in the exhaust tract (4).

10. The device as claimed in claim 5, wherein the turbine housing (16A; 16B) has a tongue (21), wherein the switching valve (19) is located upstream of the tongue (21).

11. The method as claimed in claim 1, the turbine housing (16A; 16B) has a tongue (21), wherein the joining is performed upstream of the tongue (21).

* * * * *